US007796306B2

(12) United States Patent
Hashimoto et al.

(10) Patent No.: US 7,796,306 B2
(45) Date of Patent: Sep. 14, 2010

(54) IMAGE PROCESSING APPARATUS WITH A DELETING PORTION, IMAGE PROCESSING METHOD FOR DELETING IMAGE DATA, AND IMAGE PROCESSING PROGRAM PRODUCT WITH IMAGE DATA DELETING FUNCTION

(75) Inventors: Masaya Hashimoto, Amagasaki (JP); Nobuo Kamei, Amagasaki (JP); Takeshi Morikawa, Takarazuka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1692 days.

(21) Appl. No.: 10/917,314

(22) Filed: Aug. 13, 2004

(65) Prior Publication Data

US 2005/0134932 A1 Jun. 23, 2005

(30) Foreign Application Priority Data

Dec. 17, 2003 (JP) ............................. 2003-419272
Apr. 14, 2004 (JP) ............................. 2004-119455

(51) Int. Cl.
*H04N 1/04* (2006.01)

(52) U.S. Cl. .................. 358/474; 358/1.15; 358/426.05; 358/401; 382/239; 707/999.2; 370/470; 370/546; 375/E7.093

(58) Field of Classification Search ................ 358/1.15, 358/404, 442, 474, 1.9, 1.14, 426.06; 382/170, 382/168, 239, 232, 233; 375/E7.176, E7.093; 707/999.2, 200; 370/470, 546

See application file for complete search history.

(56) References Cited

U.S. PATENT DOCUMENTS 4,485,411 A * 11/1984 Yamamoto ............... 358/296
5,229,865 A * 7/1993 Murayama ............... 358/443
5,254,284 A * 10/1993 Barone et al. ............ 510/181
6,052,346 A * 4/2000 Arataki et al. .......... 369/47.54
6,272,255 B2 * 8/2001 de Queiroz et al. ....... 382/239
6,324,305 B1 * 11/2001 Holladay et al. ......... 382/239
6,636,642 B1 * 10/2003 Yokose .................... 382/238
6,701,061 B2 * 3/2004 Karasudani et al. ......... 386/46
6,826,181 B1 * 11/2004 Higashida et al. ........ 370/390
7,099,042 B2 * 8/2006 Yaguchi .................... 358/1.9
7,184,045 B2 * 2/2007 Hidai ....................... 345/441
7,227,651 B2 * 6/2007 Kamiya .................. 358/1.14

(Continued)

FOREIGN PATENT DOCUMENTS

JP    9-284518    10/1997

(Continued)

OTHER PUBLICATIONS

Notification of Reasons for Refusal dated Feb. 28, 2006, and English translation.

*Primary Examiner*—Negussie Worku
(74) *Attorney, Agent, or Firm*—Buchanan Ingersoll & Rooney PC

(57) ABSTRACT

An image processing apparatus includes a compression/expansion device capable of compressing and expanding image data in a form of JBIG format, a nonvolatile memory which stores the image data compressed in the form of the JBIG format by the compression/expansion device, a deleting portion which makes image data-to-be-deleted stored in the memory un-restorable by deleting only head data of each plane having restoration information of the data-to-be-deleted.

32 Claims, 11 Drawing Sheets

U.S. PATENT DOCUMENTS

| | | | |
|---|---|---|---|
| 7,257,264 B2 * | 8/2007 | Nakayama et al. | 382/239 |
| 7,499,930 B2 * | 3/2009 | Naka et al. | 1/1 |
| 7,515,307 B2 * | 4/2009 | Ota | 358/300 |
| 7,561,285 B2 * | 7/2009 | Fujinaga et al. | 358/1.14 |
| 2001/0024518 A1 * | 9/2001 | Yaguchi | 382/170 |
| 2004/0148315 A1 * | 7/2004 | Itho | 707/104.1 |
| 2009/0059250 A1 * | 3/2009 | Onishi | 358/1.9 |

FOREIGN PATENT DOCUMENTS

| | | |
|---|---|---|
| JP | 2001-128120 | 5/2001 |
| WO | 01/37563 A1 | 5/2001 |

\* cited by examiner

IMAGE PROCESSING APPARATUS WITH A DELETING PORTION, IMAGE PROCESSING METHOD FOR DELETING IMAGE DATA, AND IMAGE PROCESSING PROGRAM PRODUCT WITH IMAGE DATA DELETING FUNCTION

This application claims priority under 35 U.S.C. §119 to Japanese Patent Applications No. 2003-419272 filed on Dec. 17, 2003 and No. 2004-119455 filed on Apr. 14, 2004, the entire disclosure of which is incorporated herein by reference in their entireties.

BACKGROUND OF THE INVENTION

1. Field of the Invention

The present invention relates to an image processing apparatus having a function of storing image data in a storing device and erasing the stored data, an image processing method and an image processing program product.

2. Description of Related Art

The following description sets forth the inventor's knowledge of related art and problems therein and should not be construed as an admission of knowledge in the prior art.

In a recently available image processing apparatus, e.g., an image processing apparatus for use in a copying machine, a facsimile machine, or a MFP (Multi Function Peripheral) which is a complex machine having multi-functions such as a copying function, a print function, a scan function and a facsimile function, to cope with a requirement of storing a large amount of image data of the inputted job, an apparatus equipped with a high-capacity nonvolatile memory such as a hard disk device has been provided.

In an image processing apparatus equipped with such a memory, the image data stored in the memory can be utilized repeatedly.

Among image data to be transferred to such a memory, some image data may not be required to be stored in an accumulated manner in the memory depending on the job mode. The example of such image data include image data of a normal copy job and a print job transmitted from an external computer. Even in the case of such image data, they are once stored in a memory. Furthermore, even in the case of image data stored in an accumulated manner in a memory, a user may wish to delete the image data in cases where they become no longer necessary.

To cope with the above, Japanese Unexamined Laid-open Patent Publication No. H9-284518 proposes an image processing apparatus capable of arbitrarily delete image data stored in a memory or automatically delete the image data after a certain time has passed.

In the aforementioned prior art, however, in cases where the stored image data are permanently deleted, deleting data are overwritten in the entire region of the image data. This increases the access time to the memory for deleting the image data. Therefore, writing or reading processing for another image data cannot be performed during the deleting processing, resulting in a deteriorated productivity of the apparatus.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide an image processing apparatus improved in productivity by shortening delete processing time for deleting image data stored in a memory.

Among other potential advantages, some embodiments can provide an image processing method improved in productivity by shortening delete processing time for deleting image data stored in a memory.

Among other potential advantages, some embodiments can provide an image processing program product which makes a computer execute the aforementioned image processing method.

According to a first aspect of the preferred embodiment of the present invention, an image processing apparatus, comprises:
  a compression/expansion device capable of compressing and expanding image data in a form of JBIG format;
  a nonvolatile memory which stores the image data compressed in the form of JBIG format by the compression/expansion device;
  a deleting portion which makes image data-to-be-deleted stored in the memory un-restorable by deleting only head data of each plane having restoration information of the data-to-be-deleted.

According to a second aspect of the preferred embodiment of the present invention, an image processing apparatus, comprises:
  a compression/expansion device capable of compressing and expanding image data in a form of JBIG format;
  a nonvolatile image data memory which stores the image data compressed in the form of JBIG format by the compression/expansion device;
  a management data memory which stores management data for management of information on head data of each plane having restoration information of the image data stored in the image data memory; and
  a deleting portion which makes image data-to-be-deleted stored in the image data memory un-restorable by deleting the management data stored in the management data memory.

According to a third aspect of the preferred embodiment of the present invention, an image processing method, comprising the steps of:
  storing image data in a nonvolatile memory with the image data compressed in a form of JBIG format; and
  making image data-to-be-deleted stored in the memory un-restorable by deleting only head data of each plane having restoration information of the data-to-be-deleted.

According to a fourth aspect of the preferred embodiment of the present invention, an image processing method, comprising the steps of:
  storing image data in a nonvolatile image data memory with the image data compressed in a form of JBIG format;
  storing management data in a management data memory, wherein the management data is for management of information on head data of each plane having restoration information of the image data stored in the image data memory; and making image data-to-be-deleted stored in the image data memory un-restorable by deleting the management data stored in the management data memory.

According to a fifth aspect of the preferred embodiment of the present invention, an image processing program product is a product for making a computer execute the steps of:

storing image data in a nonvolatile memory with the image data compressed in a form of JBIG format; and making image data-to-be-deleted stored in the memory un-restorable by deleting only head data of each plane having restoration information of the data-to-be-deleted.

According to a sixth aspect of the preferred embodiment of the present invention, an image processing program product is a product for making a computer execute the steps of:

storing image data in a nonvolatile memory with the image data compressed in a form of JBIG format;

storing management data in a management data memory, wherein the management data is for management of information on head data of each plane having restoration information of the image data stored in the image data memory; and making image data-to-be-deleted stored in the image data memory un-restorable by deleting the management data stored in the management data memory.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
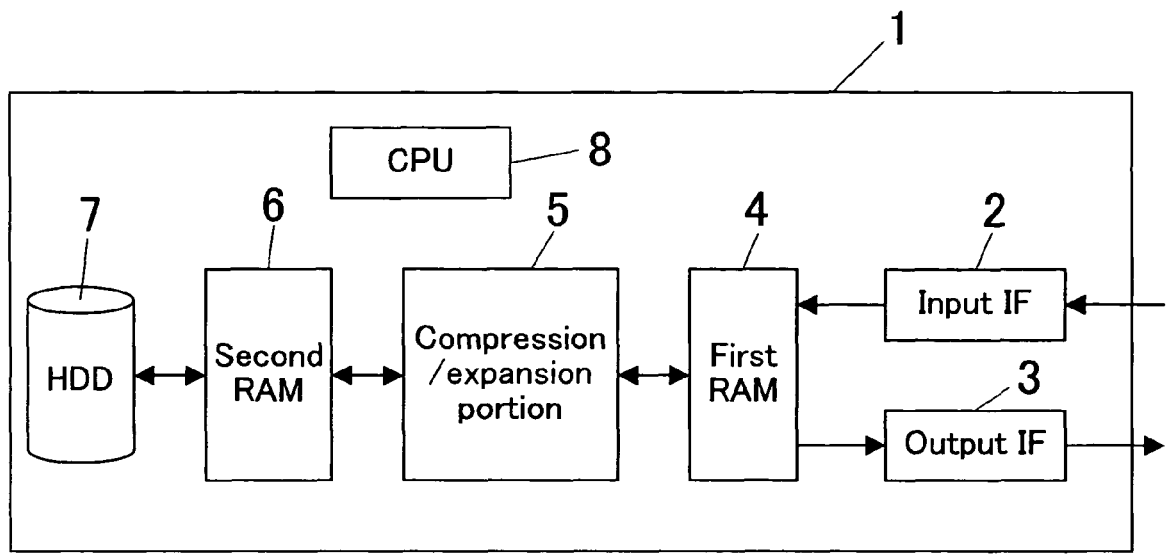
FIG. 1 is a block diagram showing a schematic structure of an image processing apparatus according to an embodiment of the present invention.

FIG. 1 is a block diagram showing a schematic structure of an image processing apparatus 1 according to an embodiment of the present invention.

The image processing apparatus 1 is provided with an input interface portion 2 (Input IF in FIG. 1), an output interface portion 3 (Output IF in FIG. 1), a volatile first RAM 4, a compression/expansion portion 5, a volatile second RAM 6, a hard disk apparatus 7 (HDD in FIG. 1) and a CPU 8.

The input interface portion 2 receives image data transmitted from external apparatuses such as an original reading apparatus, a FAX apparatus and a computer.

The output interface portion 3 transmits image data stored in the hard disk device 7 or the like to the external apparatuses.

The first RAM 4 once stores image data inputted from outside or image data to be outputted to outside, and functions as a buffer memory.

The compression/expansion portion 5 compresses image data inputted from outside and expands compressed image data read out from the hard disk device 7. In this embodiment, the compression/expansion portion 5 compresses/expands image data in the form of JBIG (Joint Bi-lebel Image experts Group) format.

The second RAM 6 once stores image data compressed by the compression/expansion portion 5 or compressed image data read out from the hard disk device 7.

The first RAM 4 and second RAM 6 can be constituted by separate RAMs or a single RAM.

The hard disk device 7 functions as a nonvolatile memory for storing image data, and the stored image data will not be erased by turning off the power source of the image processing apparatus 1.

The CPU 8 totally controls the entire image processing apparatus 1. For example, it controls a writing or reading operation of image data with respect to the first RAM 4, the second RAM 6 or the hard disk device 7, a deletion of image data, a compression/expansion operation of the compression/expansion portion 5.

The CPU 8 has other various functions. For example, the CPU 8 has a function of judging image data attribute such as whether image data is facsimile transmitting data or facsimile receiving data, whether image data is in an accumulation mode to the hard disk apparatus 7, and a function of switching image data storing mode to the hard disk device 7 in accordance with the attribute.

The aforementioned controls and functions by the CPU 8 is realized by executing the contents of image processing program recorded in the hard disk device 7 or another storing medium such as a ROM, a CD-ROM and an optical magnetic disk (not shown) by the CPU 8.

In the image processing apparatus 1 shown in FIG. 1, when image data is stored in the hard disk 7, the image processing apparatus 1 once stores the image data inputted from outside via the input interface portion 2 in the first RAM 4 as a buffer memory.

The image data stored in the first RAM 4 is compressed by the compression/expansion portion 5 in the form of JBIG format. The compressed image data is stored in the second RAM 6. The compressed image data stored in the second RAM 6 is transferred to the hard disk device 7, and therefore will not be deleted even if the power supply of the apparatus is turned off.

On the other hand, when the image data is outputted, the compressed image data is read out from the hard disk device 7 and then transferred to the second RAM 6. The transferred compressed image data is expanded by the compression/expansion portion 5, and then stored in the first RAM 4 as a buffer memory. Then, the expanded image data is transferred to outside via the output interface portion 3.

Figure 2:
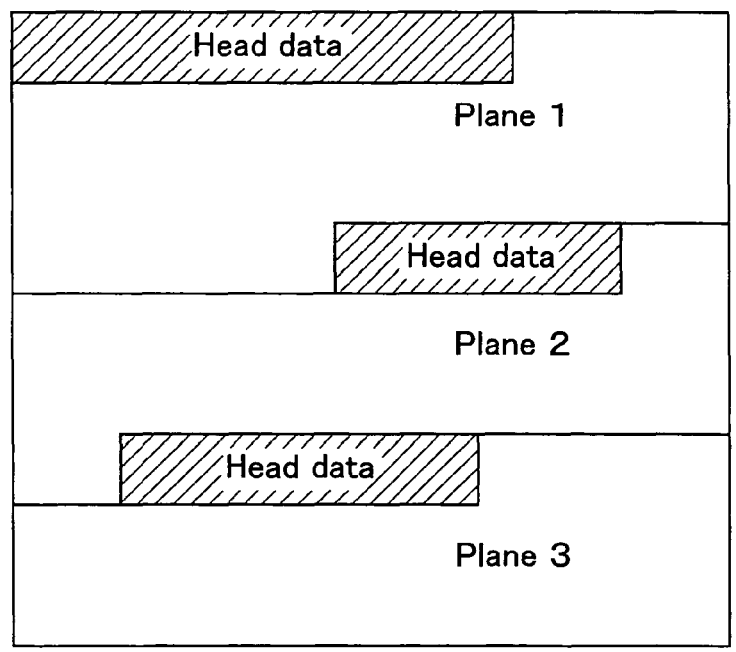
FIG. 2 is an explanatory view showing a structure of image data compressed in a JBIG format.

As will be understood from the above, the compression/expansion portion 5 has a function of performing compression/expansion processing in the form of JBIG format. The structural diagram of the image data compressed in the form of JBIG format (hereinafter referred to as "JBIG-compressed image data") is shown in FIG. 2.

The JBIG-compressed image data has a plane structure. In the data (head data) located at the head portion of each plane, information required at the time of expansion processing is stored. Accordingly, if the head data is deleted (destroyed), it becomes impossible to expand and restore the image.

The image data is JBIG-compressed by the compression/expansion portion 5 and then stored in the second RAM 6, and at the same time compressed image management data including the head integrated data of each plane is created.

Figure 3:
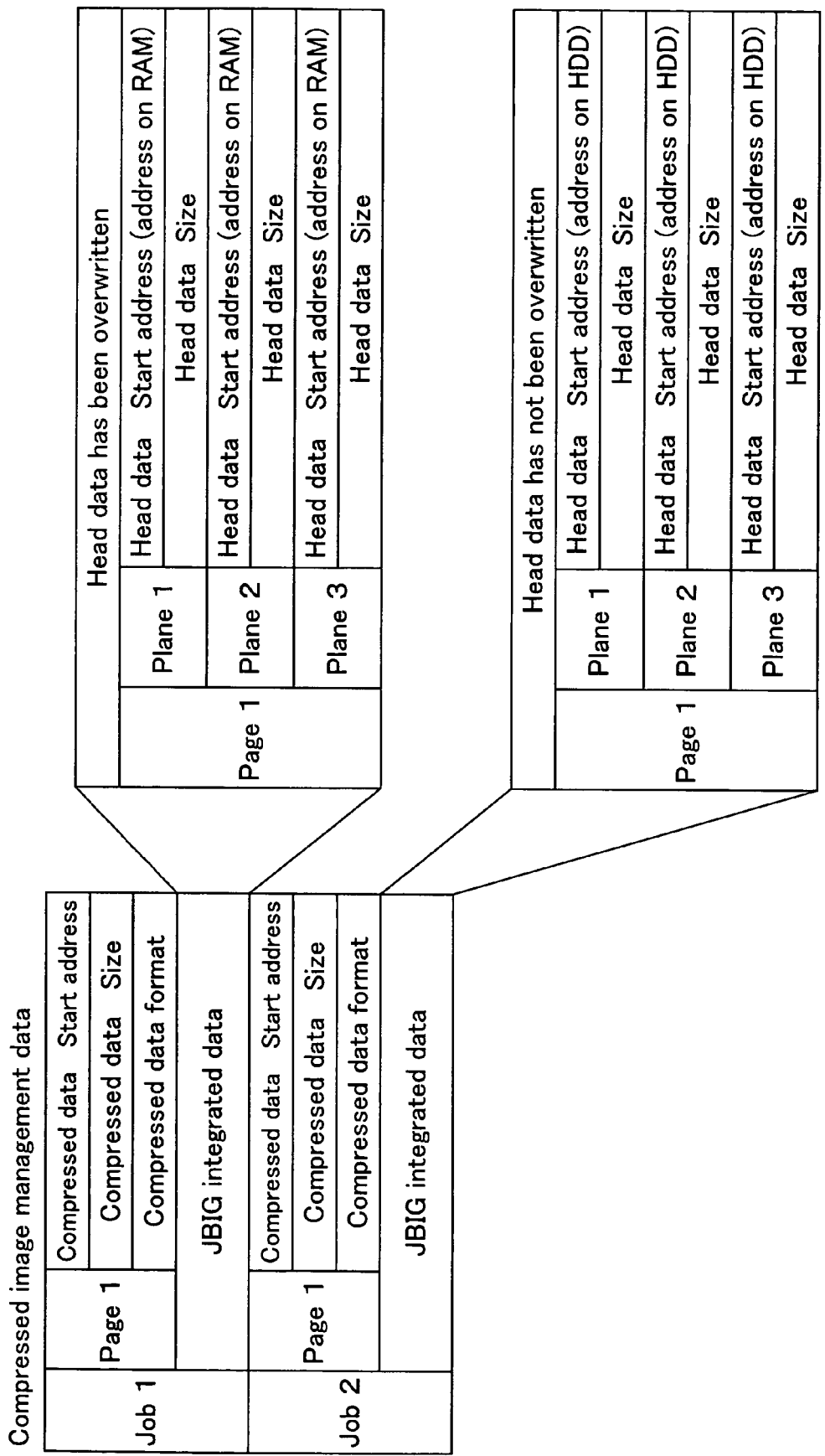
FIG. 3 is an explanatory view showing management data of compressed image data.

The structure of compressed image management data is shown in FIG. 3. The compressed image management data includes a region for page information and a region for integrated data every each job. In the region of the page information, the information of compressed data start address, compressed data size and compressed data format of each page are stored. The integrated data is managed by a job unit and stores the information on the head data start address and the head data size of each plane. By this integrated data, the storing area of the head data can be specified.

When the JBIG-compressed image data is transferred from the second RAM 6 to the hard disk device 7, depending on the job mode information, it is determined whether only the head data of each plane is stored in the second RAM 6 and that the compressed image data with the head data deleted by overwriting is transferred to the hard disk device 7 or whether the image data is transferred to the hard disk device 7 without deleting the head data by overwriting.

In cases where image data is not required to be restored when the power source of the image processing apparatus 1 is turned off (e.g., image data of a copy job or a print job), the head data is stored on the second RAM 6 and the compressed image data with the head data deleted by overwriting is transferred to the hard disk device 7. When the power source is turned off, the head data stored in the second RAM 6 as a volatile memory will be disappeared, and the head data of the compressed image data remained in the hard disk device 7 has been already deleted. Accordingly, the restoration of the compressed image data becomes impossible.

On the other hand, in cases where in a copy job or a print job a mode for accumulating image data in the hard disk device 7 is set, or in cases where image data should not be deleted even if the power source of the image processing apparatus 1 is turned off (e.g., image data to be received or transmitted via a facsimile machine), the compressed image data is transferred to and stored in the hard disk device 7 without deleting the head data by overwriting.

As explained above, depending on the image data attribute, the modes are switched between a mode in which the image data is stored in the hard disk device 7 with the head data deleted and a mode in which the image data is stored without deleting the head data. As shown in FIG. 3, in the compressed image management data, information on whether the head data is overwritten is recorded. Storing the compressed image management data in the hard disk device 7 enables a restoration of the image data even if the power source of the image processing apparatus 1 is turned off since the compressed image administration data and the image data are stored in the hard disk device 7.

Figure 4:
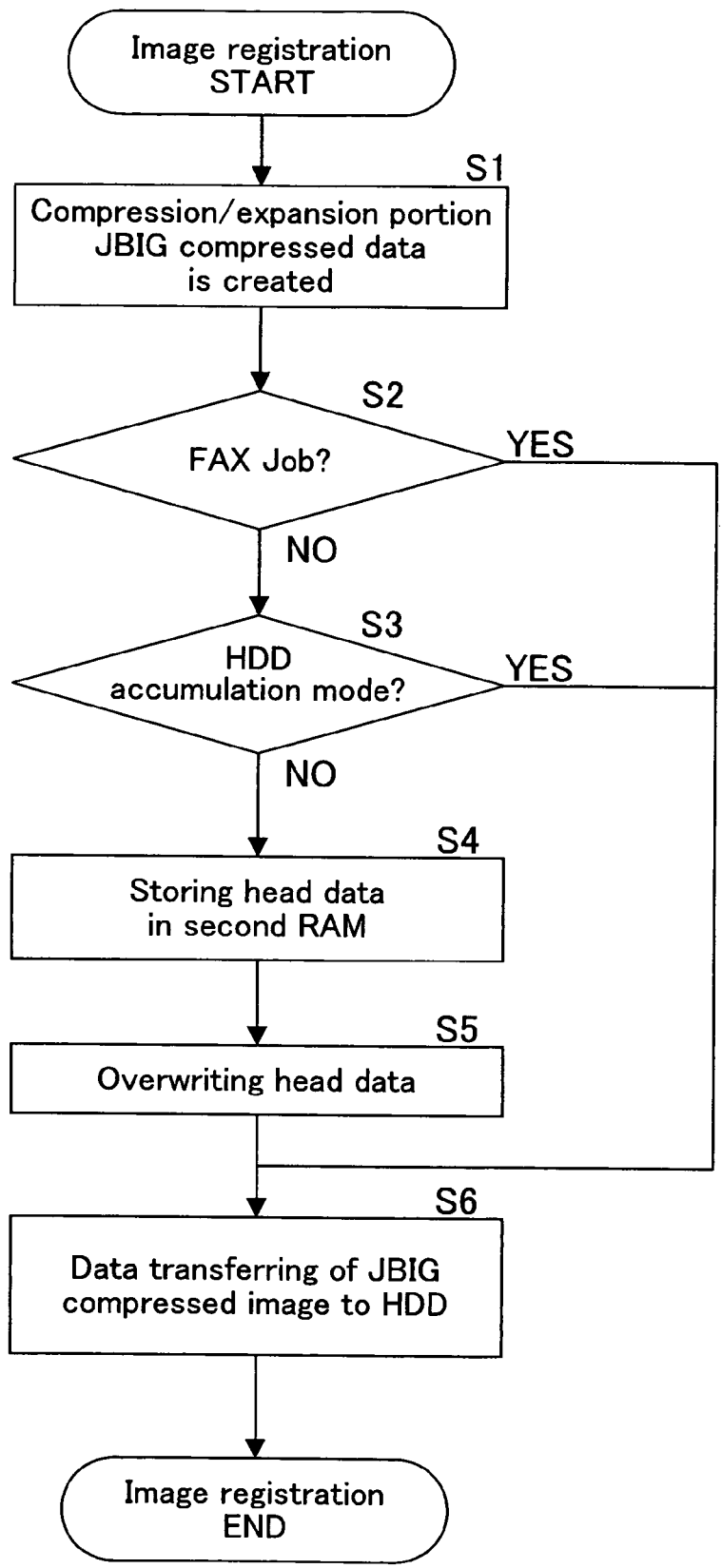
FIG. 4 is a flowchart showing registration processing of image data to be executed in the image forming apparatus shown in FIG. 1.

FIG. 4 shows a flowchart showing the registration processing to be performed under the control of the CPU 8 when there is a registration instruction of the image data from a user. The processing shown by the flowchart shown in FIG. 4 and the subsequent figures is executed by the CPU 8 operated by the program recorded in a recording medium. In the following explanation and drawings, "Step" will be abbreviated as "S."

When a registration instruction is issued from a user, at S1, the CPU 8 makes the compression/expansion portion 5 compress the image data to be registered in the form of JBIG format.

Next, at S2, it is discriminated whether the image data is image data of a facsimile job. If it is image data of a facsimile job ("Yes" at S2), since it is necessary to restore the image data even if the power source is turned off, the routine proceeds to S6 to transfer the image data as it is to the hard disk device 7 via the second RAM 6 to be stored therein without deleting the head data of each plane.

At S2, in cases where the image data is not image data of a facsimile job (No at S2), the routine proceeds to S3. At S3, it is discriminated whether the image data is image data having an accumulation mode to the hard disk device 7.

If it is image data having an accumulation mode (Yes at S3), the routine proceeds to S6 since it is necessary to restore the image data even if the power source is turned off. At S6, the image data is transferred to the hard disk device 7 as it is to be stored therein without deleting the head data of each plane.

By this processing, image data to be transmitted or received via a facsimile machine and image data having an accumulation mode to the hard disk device 7 are stored in the hard disk device 7 in a restorable manner.

At S3, if the image data is not an accumulation mode to the hard disk device 7 (No at S3), since it is image data which can become un-restorable when the power source is turned off, at S4, the head data of each plane is stored in the second RAM 6. Then, at S5, the head data is overwritten by deleting data to be deleted. At S6, the image data with the head data deleted is transferred to the hard disk device 7 to be stored therein. In this case, since the head data stored in the second RAM 6, which is a volatile memory, is deleted when the power source is turned off, the image data stored in the hard disk device 7 becomes un-restorable. By this, it becomes possible for unnecessary image data to be remained in the hard disk device 7 in an un-restorable manner, resulting in an enhanced security.

As explained above, by switching storing modes depending on image data attribute, it becomes possible for the image data to store in the hard disk device 7 in an appropriate storing mode in accordance with the image data attribute.

Figure 5:
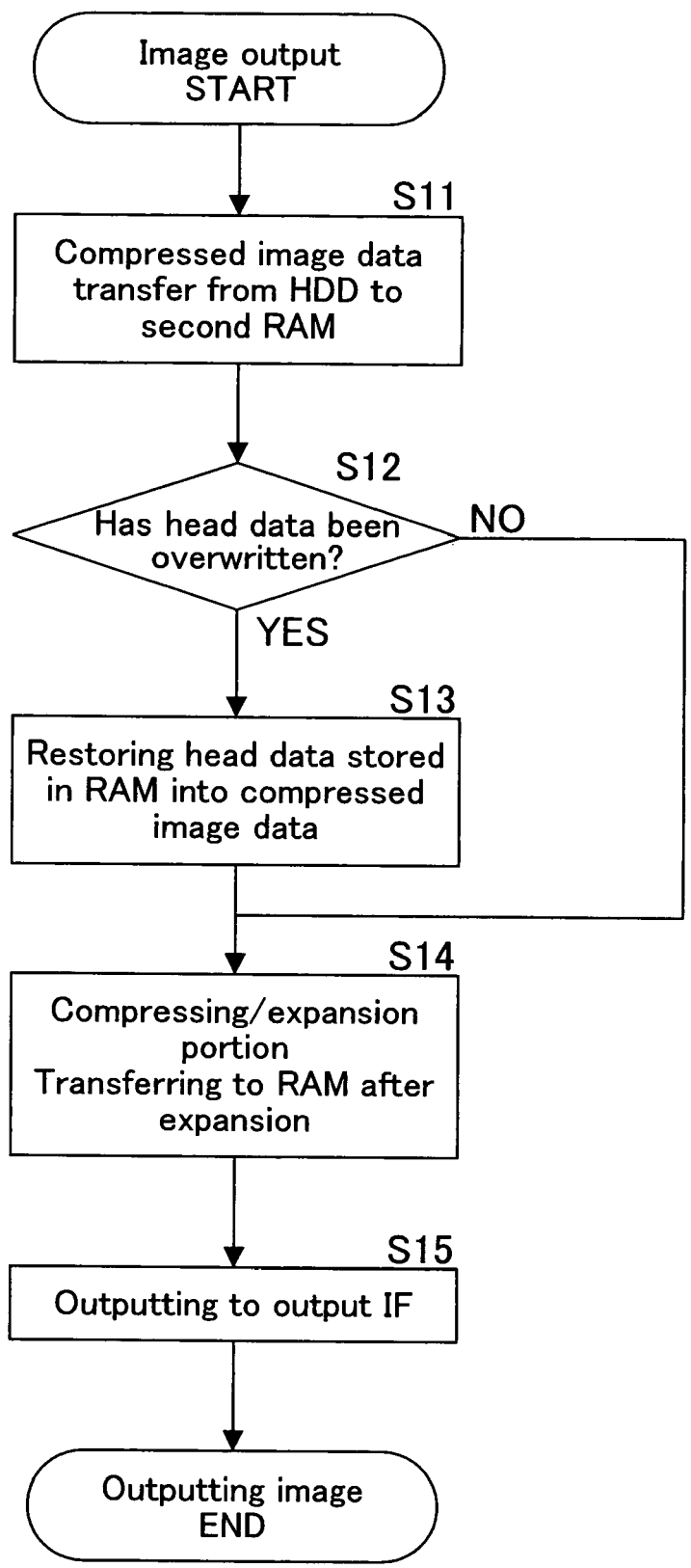
FIG. 5 is a flowchart showing output processing of the image data.

FIG. 5 is a flowchart showing output processing when an output instruction of image data stored in the hard disk device 7 is issued by an user.

When there is an output instruction of image data, at S11, the CPU 8 transfers the specified compressed image data from the hard disk device 7 to the second RAM 6.

Next, at S12, based on the integrated data included in the compressed management image data, it is discriminated whether the head data of each plane of the compressed image data has been overwritten. If overwritten (Yes at S12), at S13, the head data of each plane stored in the second RAM 6 is restored into the compressed image data. Then, at S14, the image data is expanded by the compression/expansion portion 5 and then transferred to the first RAM 4.

At S12, if the head data has not been overwritten (No at S12), the routine proceeds to S14 to make the compression/expansion portion 5 expand the compressed image data at it is. Then, the image data is transferred to the first RAM 4.

Next, the routine proceeds to S15. At S15, the image data transferred to the first RAM 4 is outputted outside via the output interface portion 3.

Figure 6:
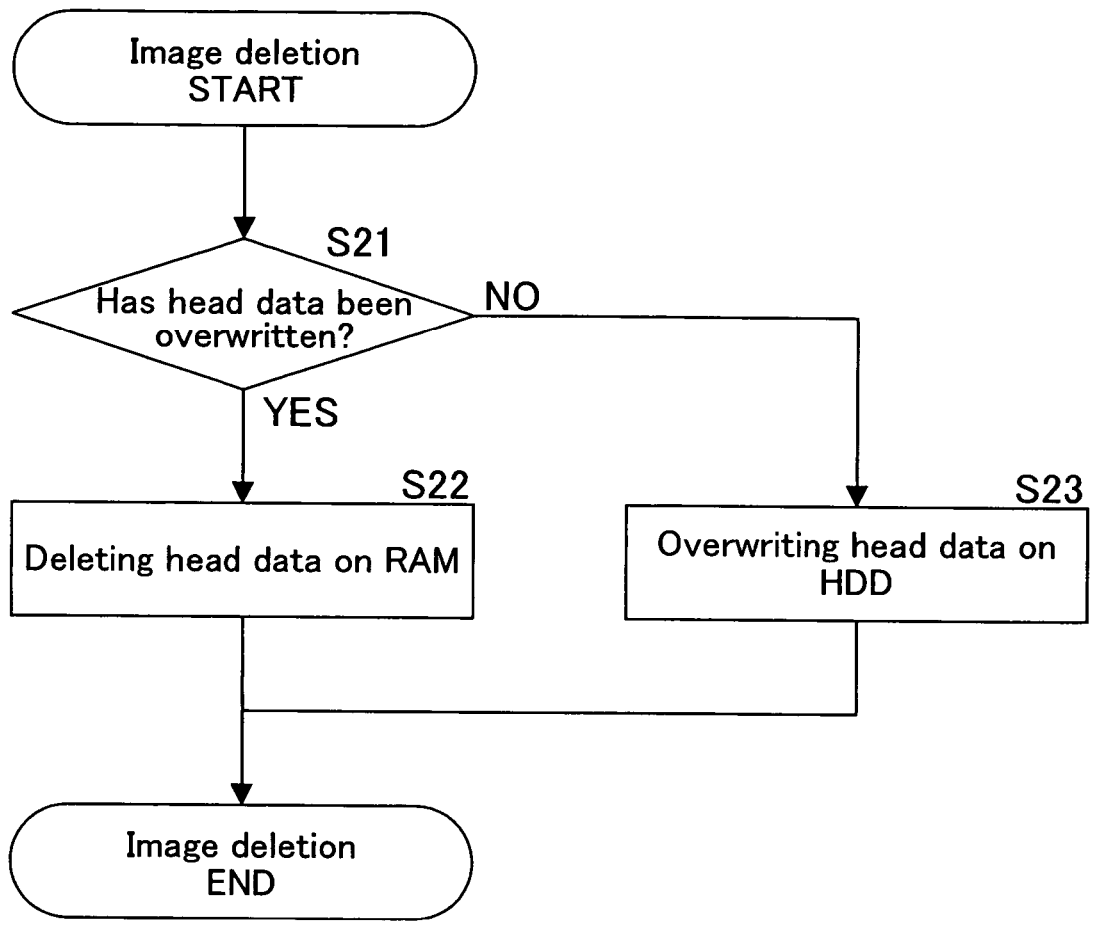
FIG. 6 is a flowchart showing delete processing of the image data.

FIG. 6 is a flowchart showing delete processing of image data when an delete instruction of image data is issued by a user.

When a delete instruction of the image data is received by the CPU 8, at S21, the CPU 8 reads out the integrated data contained in the compressed image management data of the specified job, and then discriminates whether the image data is transferred to the hard disk device 7 after the overwriting of the head data.

If the head data is overwritten (Yes at S21), at S22, the head data stored in the second RAM 6 has been overwritten to be deleted. By this, it becomes possible to make the image data un-restorable. To the contrary, if not overwritten (No at S21), since the head data has not been deleted, the routine proceeds to S23. At S23, the head data of the compressed image data stored in the hard disk device 7 is overwritten to be deleted. By this, the image data becomes un-restorable.

As explained above, in cases where the image data stored in the hard disk device 7 is deleted, it only requires to overwrite the head data by deleting the data. This eliminates overwriting of the entire region of the image data, resulting in a shortened delete processing time. Accordingly, the execution of the delete processing shortens a time in which execution of another processing is interrupted, resulting in an increased productivity of the image processing apparatus.

Figure 7:
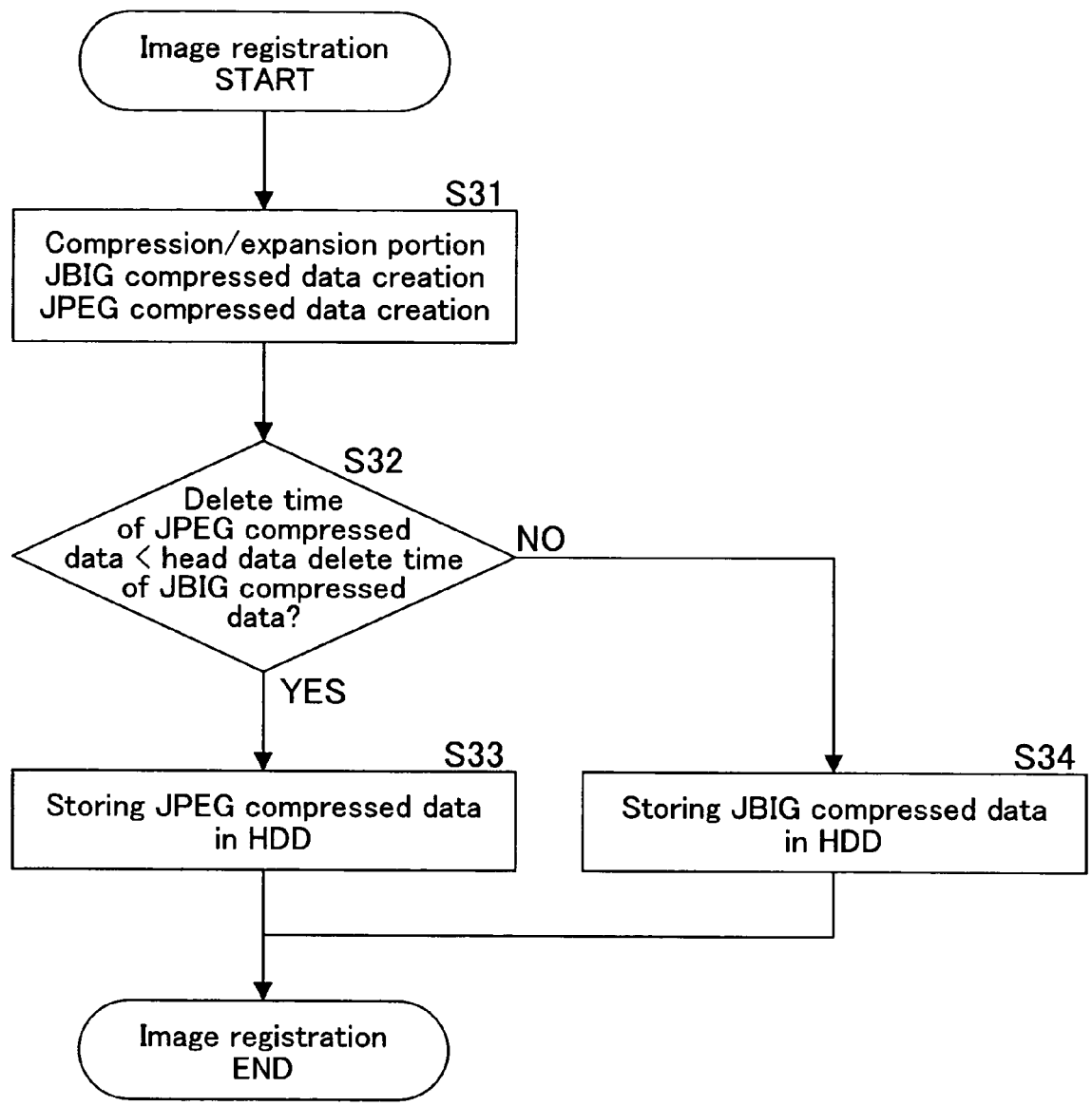
FIG. 7 is a flowchart showing registration processing of image data according to another embodiment of the present invention.
Figure 8:
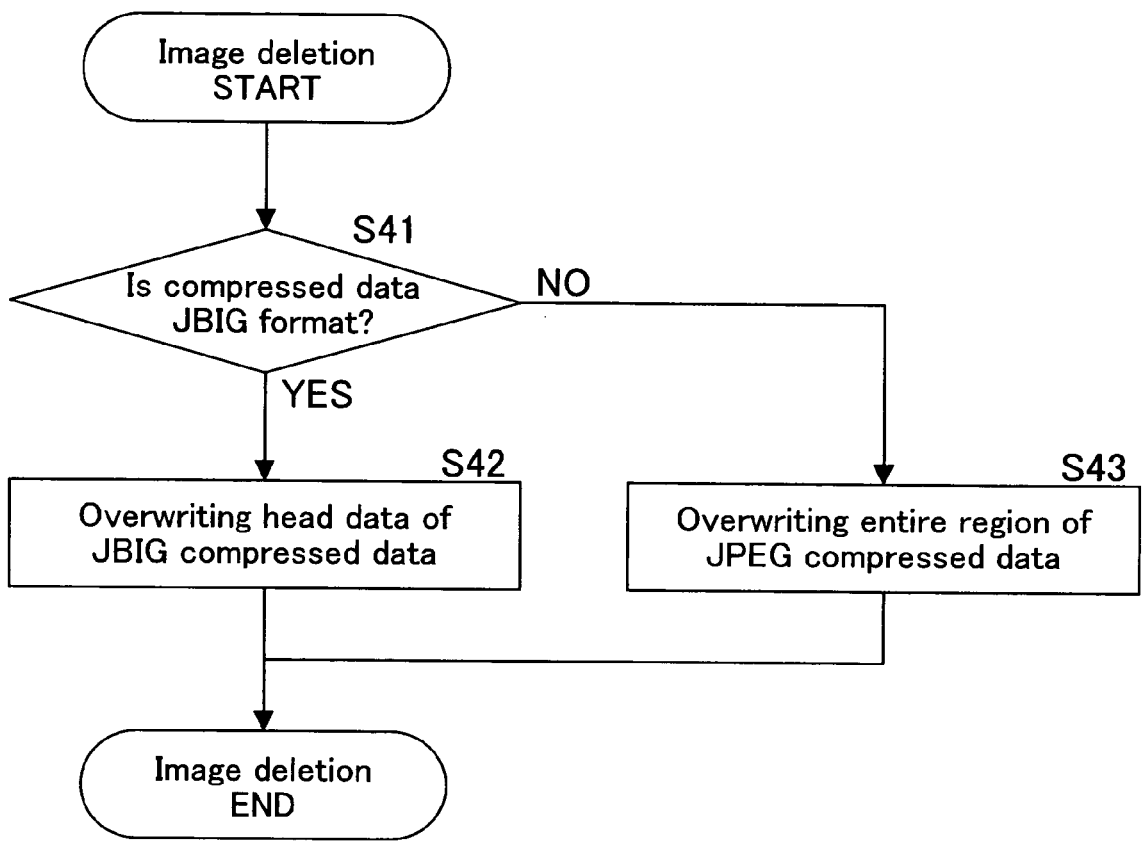
FIG. 8 is a flowchart showing delete processing of the image data.

FIGS. 7 and 8 show another embodiment of the present invention. FIG. 7 is a flowchart showing registration processing of image data executed under the control of CPU 8. FIG. 8 is a flowchart showing delete processing of image data when a delete instruction of image data is issued by a user.

In this embodiment, the compression/expansion portion 5 can not only compresses/expands image data in the form of JBIG format but also compress/expands image data in the form of data format in which the entire data region should be deleted by overwriting at the time of erasing image data. As an example of the data format required to delete the entire data region at the time of erasing image data, JPEG (Joint Photographic Experts Group) or PDF (Portable Document Format) can be exemplified. The following explanation will be directed to the case of a JPEG format.

Furthermore, the CPU 8 functions as a delete time comparator which compares a time required to delete the image data by deleting (overwriting) the entire region of the image data compressed in the form of JPEG format and a time required to delete the head data of the same image data compressed in the form of JBIG format. In addition to the above, the CPU 8 stores the image data compressed in the shorter delete time format in the hard disk device 7.

Hereinafter the explanation will be directed to FIGS. 7 and 8.

At S31, the CPU 8 makes the compression/expansion portion 5 compress the image data in both the forms of JBIG and JPEG.

Next, at S32, the CPU 8 discriminates whether the time required to delete the image data by deleting the entire region of the image data compressed in the form of JPEG format is shorter than the time required to delete the head data of the same image data compressed in the form of JBIG format. If the delete time of the JPEG compressed data is shorter than the delete time of the head data of the JBIG compressed data (Yes at S32), the routine proceeds to S33. At S33, the CPU 8 transfers the JPEG compressed data to the hard disk device 7 and makes the hard disk store the data. If the delete time of the head data of the JBIG compressed data is shorter than the delete time of the JPEG compressed data (No at S32), the routine proceeds to S34. At S34, the CPU 8 transfers the JBIG compressed data to the hard disk device 7 and makes the hard disk store the data.

Next, in cases where the CPU 8 receives a delete instruction of the registered image data, the CPU 8 discriminates whether the compression format of the image data is a JBIG format. If it is a JBIG format (Yes as S41), at S42, the CPU 8 overwrites the head data of the image data to delete the head data. On the other hand, in the case of a JPEG format (No at S41), at S43, the CPU 8 overwrites the entire region of the image data to delete the image data. This causes the image data un-resotrable.

In this embodiment, since the image data has been stored in the shorter delete time format between a JBIG format and a JPEG format, the delete time can be assuredly shortened to thereby improve the productivity.

FIGS. 9 to 12 show another embodiment of the present invention. In this embodiment, image data is deleted not by deleting head data of image data in the form of JBIG format but by deleting management data which manages image data.

Figure 9:
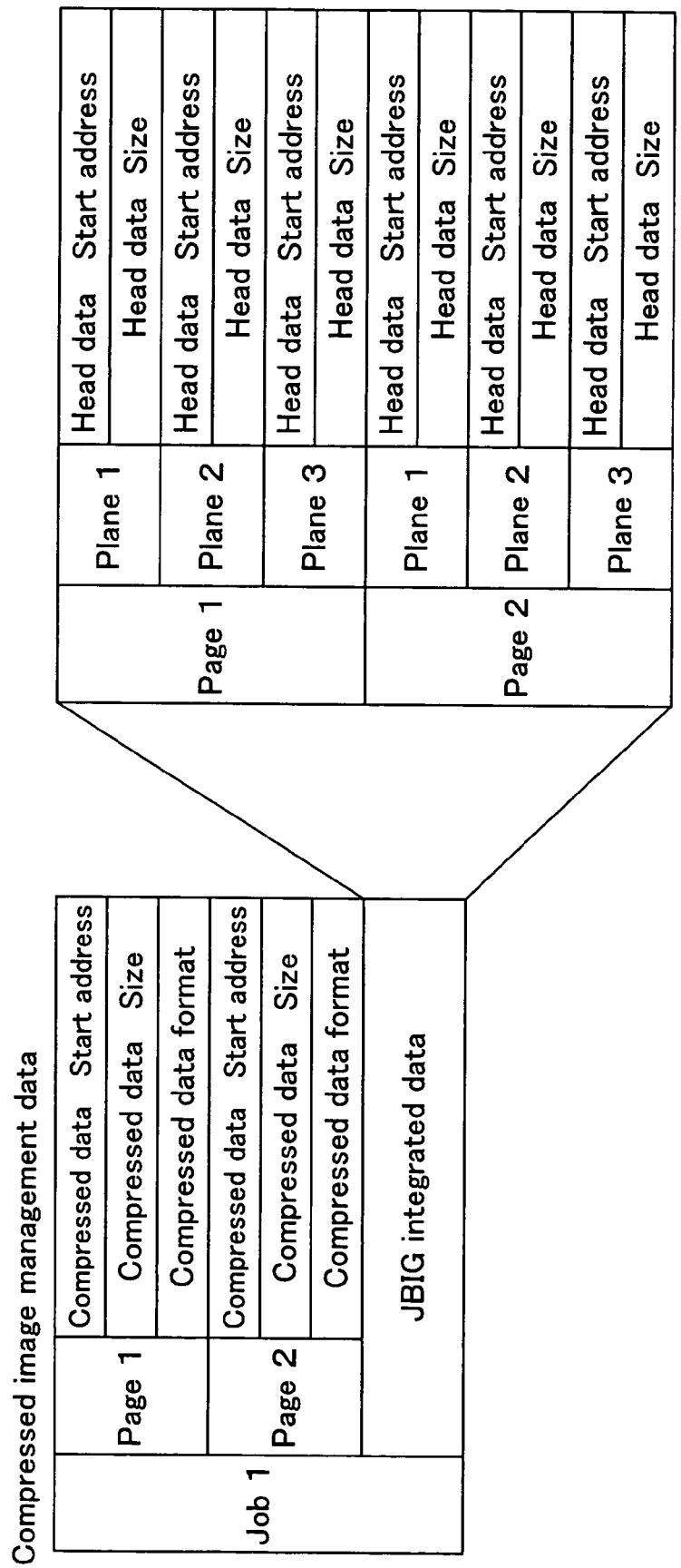
FIG. 9 is an explanatory view showing management data of compressed image data according to still another embodiment of the present invention.

FIG. 9 shows the structure of compressed image administration data formed in this embodiment. Different from the compressed image management data shown in FIG. 3, the compressed image management data shown in FIG. 9 is created by a job unit and managed. In the compressed image management data of each job unit, like the compressed image management data shown in FIG. 9, a region of page information and a region of JBIG integrated data are provided. In the page information region, information regarding a compressed data start address, a compressed data size and a compressed data format of each page is stored. The integrated data includes information regarding the head data start address and the head data size of each plane. This integrated data enables an identification of the storing area of the head data.

Figure 10:
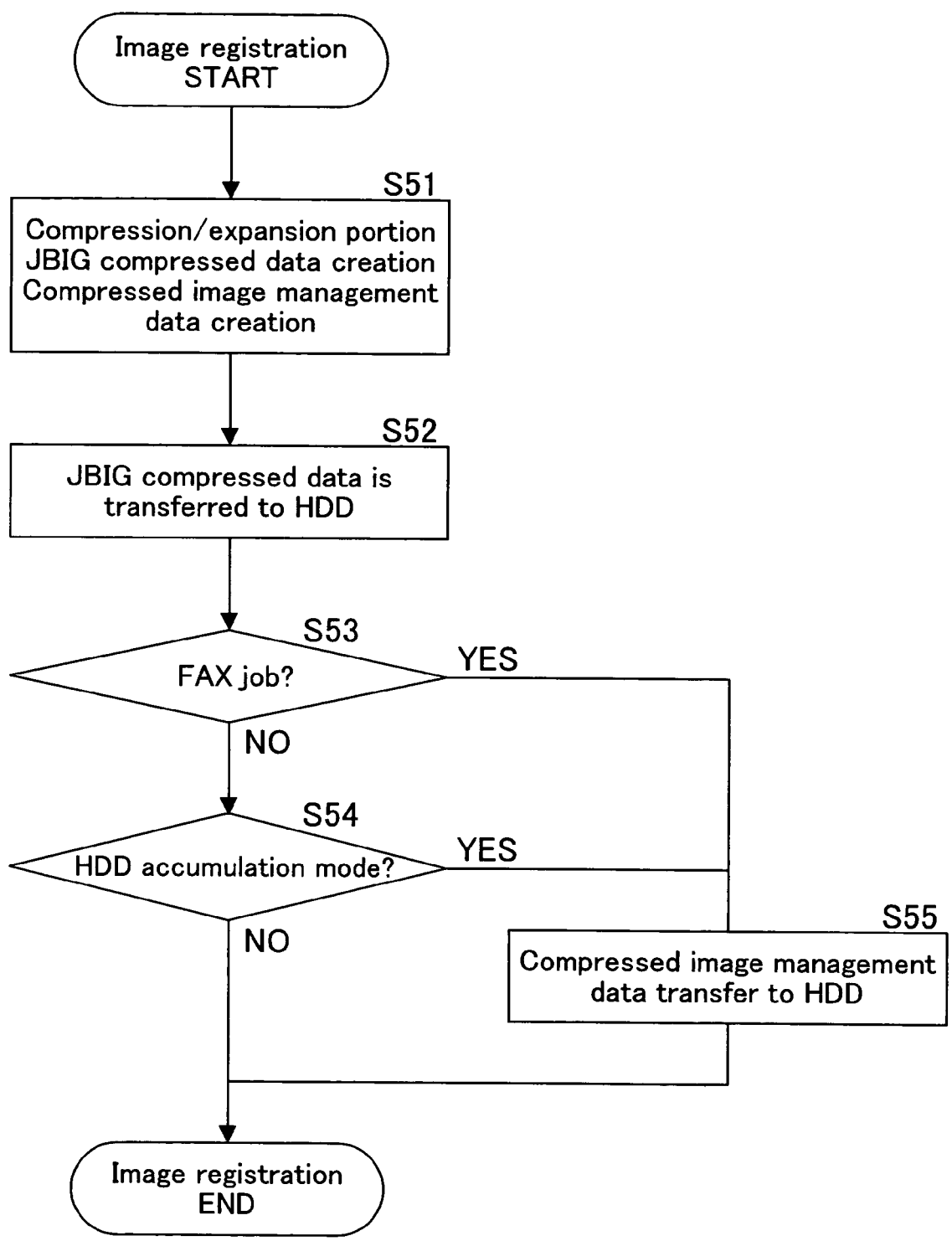
FIG. 10 is a flowchart showing registration processing of the image data.

FIG. 10 is a flowchart showing registration processing of image data performed under the control of the CPU 8 when a registration instruction of image data is issued by a user.

When there is a registration instruction from a user, at S51, the CPU 8 makes the compression/expansion portion 5 compress image data-to-be-registered in the form of JBIG format. At the same time, the CPU 8 creates compressed image management data including the head integrated data of each plane on the second RAM 6.

Next, at S52, the CPU 8 transfers the compressed data to the hard disk device 7 and makes the hard disk device 7 store the compressed data. At S53, the CPU 8 discriminates whether the image data is image data of a facsimile job.

If it is image data of a facsimile job (Yes at S53), since it is required to restore the image data even if the power source is turned off, the routine proceeds to S55. At S55, the CPU 8 transfers the compressed image management data to the hard disk device 7 and makes the hard disk device store the data.

At S53, in cases where the image data is not image data of a facsimile job (No at S53), the routine proceeds to S54. At S54, it is discriminated whether the image data is image data having an accumulation mode to the hard disk device 7.

If it is image data having an accumulation mode (Yes at S54), since it is required to restore the image data even if the power source is turned off, the routine proceeds to S55. At S55, the CPU 8 transfers the compressed image management data to the hard disk device 7 and makes the hard disk device store the data.

By the aforementioned processing, compressed image data regarding image data having a facsimile transmitting or receiving mode or image data having an accumulation mode to the hard disk device 7 is stored in the hard disk device 7.

At S54, if it is not the accumulation mode to the hard disk device 7 (No at S54), since the image data is allowed to become un-restorable when the power source is turned off, the compressed image management data created on the second RAM 6 is stored in the second RAM 6 at it is without being transferred to the hard disk device 7.

In this case, since the compressed image management data stored in the second RAM 6, which is a volatile memory, is deleted when the power source is turned off, the image data stored in the hard disk device 7 becomes un-restorable. Thus, it becomes possible for unnecessary image data to be remained in the hard disk device 7 in an un-restorable manner, resulting in an enhanced security.

As will be understood from the above, by switching the store mode of the compressed image management data depending on the image data attribution, it becomes possible to perform an appropriate image data management in accordance with the image data attribution.

Figure 11:
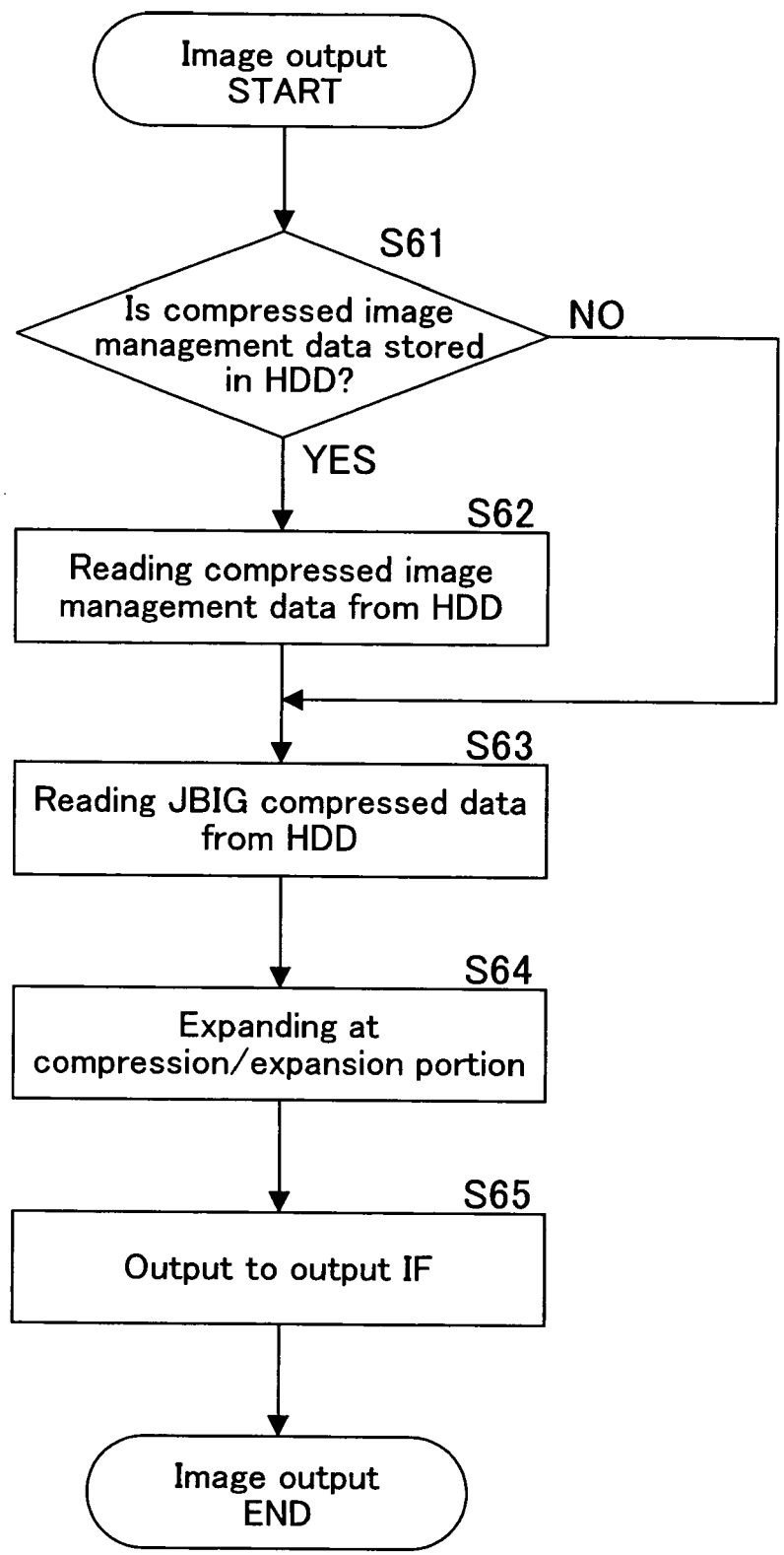
FIG. 11 is a flowchart showing output processing of the image data.

FIG. 11 shows a flowchart showing output processing when an output instruction of image data stored in the hard disk device 7 is issued by a user.

When an output instruction of a specified image data is issued by a user, at S61, the CPU 8 discriminates whether the compressed image management data of the specified image data has been stored in the hard disk device 7 or the second RAM 6. When it is discriminated that the compressed image management data has been stored in the hard disk device 7 (Yes at S61), the routine proceeds to S62. At S62, the compressed image management data is read out from the hard disk device 7, and then the routine proceeds to S63. On the other hand, when it is discriminated that no compressed image management data has been stored in the hard disk device 7, i.e., the data has been stored on the second RAM 6 (No at S61), the routine proceeds to S63 as it is.

At S63, based on the compressed image management data, image data including head data is read out from the hard disk device 7 and then transferred to the second RAM 6.

Next, the routine proceeds to S64, the compressed image data is expanded by the compression/expansion portion 5 and then transferred to the first RAM 4.

Next, the routine proceeds to S65. At S65, the image data transferred to the first RAM 4 is outputted outside from the output interface portion 3.

Figure 12:
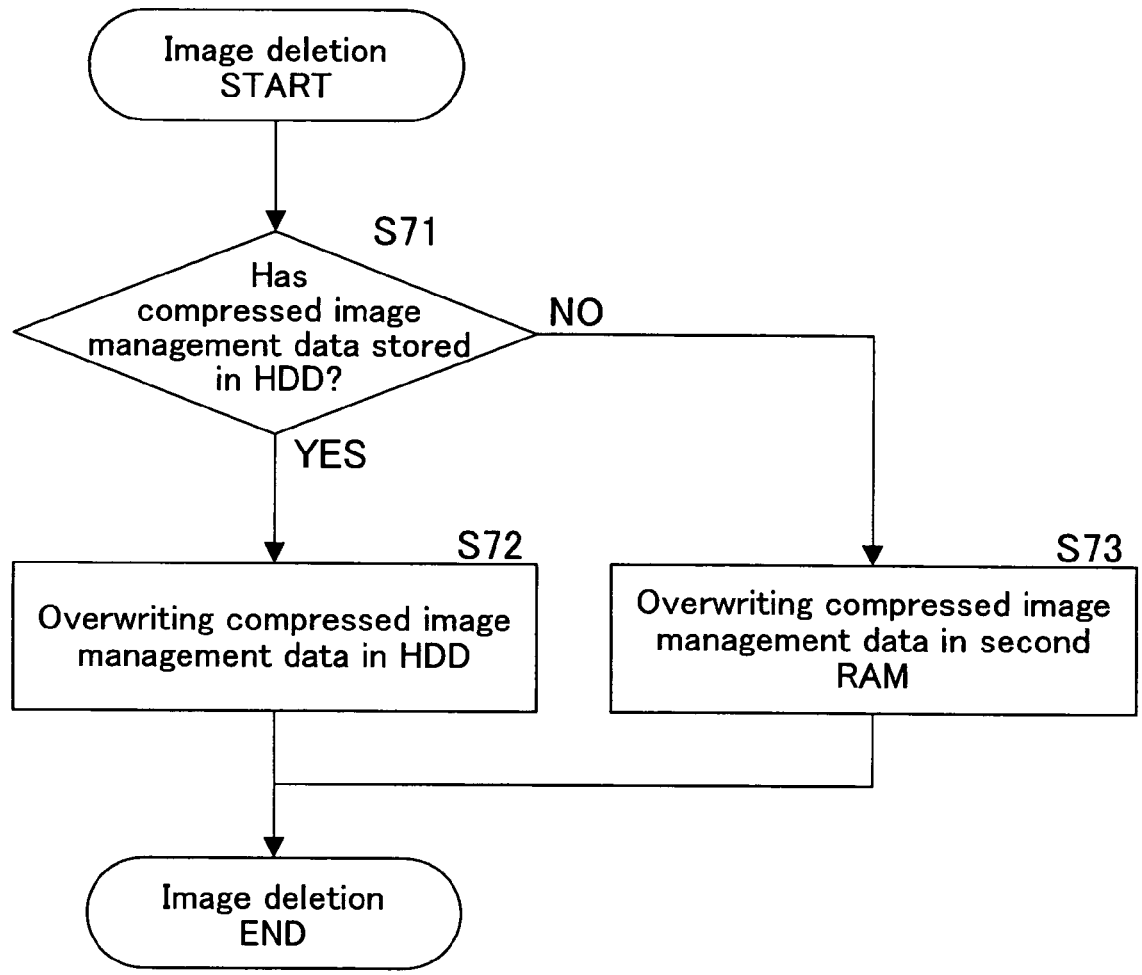
FIG. 12 is a flowchart showing delete processing of the image data.

FIG. 12 shows a flowchart showing delete processing of image data when a delete instruction of the image data is issued from a user.

When the CPU 8 receives a delete instruction of the image data, at S71, the CPU 8 discriminates whether the compressed image management data of the specified image data has been stored in the hard disk device 7 or the second RAM 6. If it is discriminated that the compressed image management data has been stored in the hard disk device 7 (Yes at S71), at S72, the CPU 8 deletes the corresponding compressed image management data in the hard disk device 7 by overwriting the data.

To the contrary, if it is discriminated that no compressed image management data has been stored in the hard disk device 7, i.e., the data has been stored in the second RAM 6 (No at S71), at S73, the CPU 8 deletes the corresponding compressed image management data in the second RAM 6 by overwriting the data.

As explained above, by deleting the corresponding compressed image management data by overwriting it, an access to the head data of the corresponding image data becomes impossible, which makes the image data un-restorable.

Although the deletion of compressed image management data by overwriting it can be performed by overwriting the entire region of the compressed image management data, at least JBIG integrated region showing the storing area of the head data can be overwritten.

As will be understood from the above, in this embodiment, by deleting the compressed image management data by overwriting it, the image data stored in the hard disk device 7 is erased in an un-restorable manner by overwriting it. Therefore, it is no longer required to overwrite the entire region of the image data, resulting in a shortened erase/delete processing time. Accordingly, a time in which an execution of another processing interrupts another processing can be shortened, resulting in an improved productivity of the image processing device.

In the aforementioned embodiments, the hard disk device is used as a nonvolatile memory for accumulating image data. However, in place of the hard disk device, any nonvolatile memory capable of keeping the storing state even if a power source is turned of can be used. Furthermore, a memory in a hard disk device can be equipped in other than a main body of the image processing apparatus. For example, the image processing apparatus can be a device for storing image data in a memory of a terminal existing on a network, or one or more elements of an image processing apparatus an be connected via a network.

Furthermore, the image processing program explained in the aforementioned embodiments can be provided as a storing medium in which the program is recorded or can be provided as a program product via a network communication.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. An image processing apparatus, comprising:
 a compression/expansion device capable of compressing and expanding image data in a JBIG format;
 a nonvolatile memory which stores the image data compressed in the JBIG format by the compression/expansion device; and
 a deleting portion which makes the compressed image data that is stored in the nonvolatile memory and that is to be deleted un-restorable by deleting only head data of the compressed image data, wherein the head data includes restoration information of the data that is to be deleted.

2. The image processing apparatus as recited in claim 1, further comprising a volatile memory,
 wherein the volatile memory stores only the head data of the image data compressed in the JBIG format and the nonvolatile memory stores the image data with the head data deleted, and
 wherein the deleting portion makes the image data stored in the nonvolatile memory non-restorable by deleting the head data stored in the volatile memory.

3. The image processing apparatus as recited in claim 2, further comprising a switching portion for switching modes between a mode in which the image data compressed in the JBIG format is stored in the nonvolatile memory with the head data deleted and a mode in which the image data compressed in the JBIG format is stored in the nonvolatile memory with the head data not deleted.

4. The image processing apparatus as recited in claim 3, wherein the switching portion switches the modes depending on an image data attribute.

5. The image processing apparatus as recited in claim 1, wherein the compression/expansion device is capable of compressing and expanding the image data in a data format in which an entire data area is required to be deleted at the time of deleting the image data.

6. The image processing apparatus as recited in claim 5, further comprising:
 a delete time comparator which compares an entire data delete time required to delete the image data compressed in the data format in which the entire data area is required to be deleted and a head data delete time required to delete the head data of the image data compressed in the JBIG format; and
 a controller which makes the nonvolatile memory store the image data compressed in a shorter delete time format of the two formats.

7. The image processing apparatus as recited in claim 1, wherein the compressed image data has a plane structure, and the head data is located at a head portion of each plane.

8. An image processing apparatus, comprising:
 a compression/expansion device capable of compressing and expanding image data in a JBIG format;
 a nonvolatile image data memory which stores the image data compressed in the JBIG format by the compression/expansion device;
 a management data memory which stores management data for management of information on head data of compressed image data having restoration information of the image data stored in the nonvolatile image data memory; and
 a deleting portion which makes the compressed image data that is stored in the nonvolatile image data memory and that is to be deleted un-restorable by deleting the management data stored in the management data memory.

9. The image processing apparatus as recited in claim 8, wherein the management data is created and managed by a job unit.

10. The image processing apparatus as recited in claim 8, wherein the management data memory includes a volatile memory and the nonvolatile memory, and further comprising a switching portion which switches modes between a mode in which the management data is stored in the volatile memory and a mode in which the management data is stored in the nonvolatile memory.

11. The image processing apparatus as recited in claim 10, wherein the switching portion switches the modes depending on an image data attribute.

12. The image processing apparatus as recited in claim 8, wherein the compressed image data has a plane structure, and the head data is located at a head portion of each plane.

13. An image processing method, comprising the steps of:
 storing image data in a nonvolatile memory of an image processing apparatus with the image data compressed in a JBIG format; and
 making the compressed image data that is stored in the nonvolatile memory and that is to be deleted un-restorable by deleting only head data of the compressed image data, wherein the head data includes restoration information of the data that is to be deleted.

14. The image processing method as recited in claim 13, wherein the step of storing the image data includes steps of storing only the head data of the image data compressed in the JBIG format in a volatile memory and storing the image data in the nonvolatile memory with the head data deleted, and
 wherein the step of making the image data-to-be-deleted stored in the nonvolatile memory un-restorable is performed by deleting the head data stored in the volatile memory.

15. The image processing method as recited in claim 14, further comprising a switching step for switching modes between a mode in which the image data compressed in the JBIG format is stored in the nonvolatile memory with the head data deleted and a mode in which the image data compressed in the JBIG format is stored in the nonvolatile memory with the head data not deleted.

16. The image processing method as recited in claim 15, wherein in the switching step the modes are switched depending on an image data attribute.

17. The image processing method as recited in claim 13, further comprising the steps of:
 comparing an entire data delete time required to delete the image data in cases where the image data is compressed in a data format in which the entire data area is required to be deleted and a head data delete time required to delete the head data in cases where the image data is compressed in the JBIG format; and storing the image data compressed in a shorter delete time format of the two formats in the nonvolatile memory.

18. The image processing method as recited in claim 13, wherein the compressed image data has a plane structure, and the head data is located at a head portion of each plane.

19. An image processing method, comprising the steps of:
storing image data in a nonvolatile image data memory of an image processing apparatus with the image data compressed in a JBIG format;
storing management data in a management data memory, wherein the management data is for management of information on head data of compressed image data having restoration information of the image data stored in the nonvolatile image data memory; and
making the compressed image data that is stored in the nonvolatile image data memory and that is to be deleted un-restorable by deleting the management data stored in the management data memory.

20. The image processing method as recited in claim 19, further comprising a switching step for switching modes between a mode in which the management data is stored in a volatile management data memory and a mode in which the management data is stored in a nonvolatile management data memory.

21. The image processing method as recited in claim 20, wherein in the switching step the modes are switched depending on an image data attribute.

22. The image processing method as recited in claim 19, wherein the compressed image data has a plane structure, and the head data is located at a head portion of each plane.

23. A computer readable medium encoded with a computer-executable image processing program having instructions for making a computer execute the steps of:
storing image data in a nonvolatile memory with the image data compressed in a JBIG format; and
making the compressed image data that is stored in the nonvolatile memory and that is to be deleted un-restorable by deleting only head data of the compressed image data, wherein the head data includes restoration information of the data that is to be deleted.

24. The computer readable medium as recited in claim 23, wherein the program makes the computer execute processing of:
storing only the head data of the image data compressed in the JBIG format in a volatile memory and storing the image data in the nonvolatile memory with the head data deleted; and
making the image data-to-be-deleted stored in the nonvolatile memory un-restorable by deleting the head data stored in the volatile memory.

25. The computer readable medium as recited in claim 24, wherein the program further makes the computer execute a switching step for switching modes between a mode in which the image data compressed in the JBIG format is stored in the nonvolatile memory with the head data deleted and a mode in which the image data compressed in the JBIG format is stored in the nonvolatile memory with the head data not deleted.

26. The computer readable medium as recited in claim 25, wherein in the switching step the modes are switched depending on an image data attribute.

27. The computer readable medium as recited in claim 23, wherein the program further makes the computer execute the steps of:
comparing an entire data delete time required to delete the image data in cases where the image data is compressed in a data format in which the entire data area is required to be deleted and a head data delete time required to delete the head data in cases where the image data is compressed in the JBIG format; and
storing the image data compressed in a shorter delete time format of the two formats in the nonvolatile memory.

28. The computer readable medium as recited in claim 23, wherein the compressed image data has a plane structure, and the head data is located at a head portion of each plane.

29. A computer readable medium encoded with a computer-executable image processing program having instructions for making a computer execute the steps of:
storing image data in a nonvolatile image data memory with the image data compressed in a JBIG format;
storing management data in a management data memory, wherein the management data is for management of information on head data of compressed image data having restoration information of the image data stored in the nonvolatile image data memory; and
making the compressed image data that is stored in the nonvolatile image data memory and that is to be deleted un-restorable by deleting the management data stored in the management data memory.

30. The computer readable medium as recited in claim 29, wherein the program further makes the computer execute a switching step for switching modes between a mode in which the management data is stored in a volatile management data memory and a mode in which the management data is stored in a nonvolatile management data memory.

31. The computer readable medium as recited in claim 30, wherein in the switching step the modes are switched depending on an image data attribute.

32. The computer readable medium as recited in claim 29, wherein the compressed image data has a plane structure, and the head data is located at a head portion of each plane.

* * * * *